Patented Apr. 21, 1942

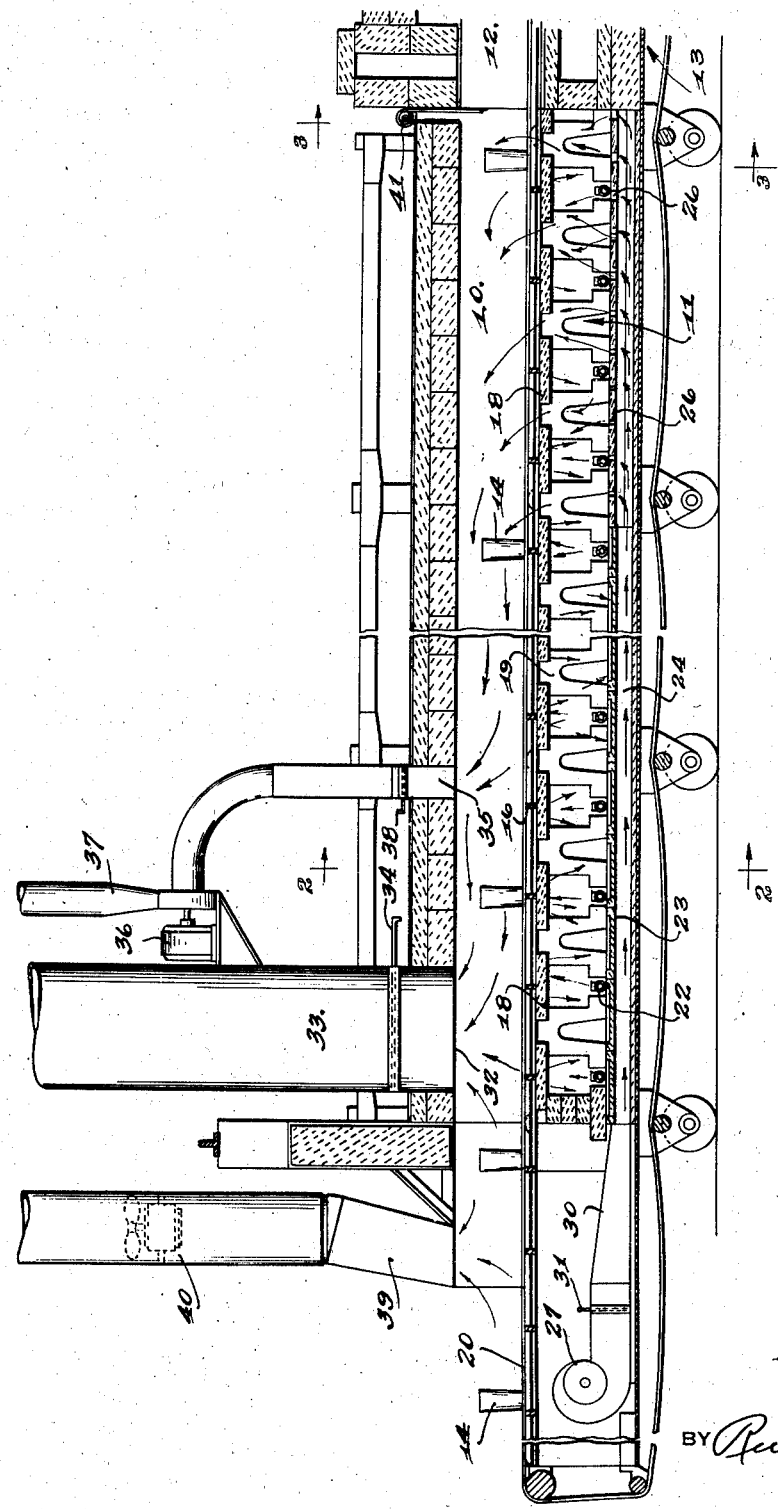

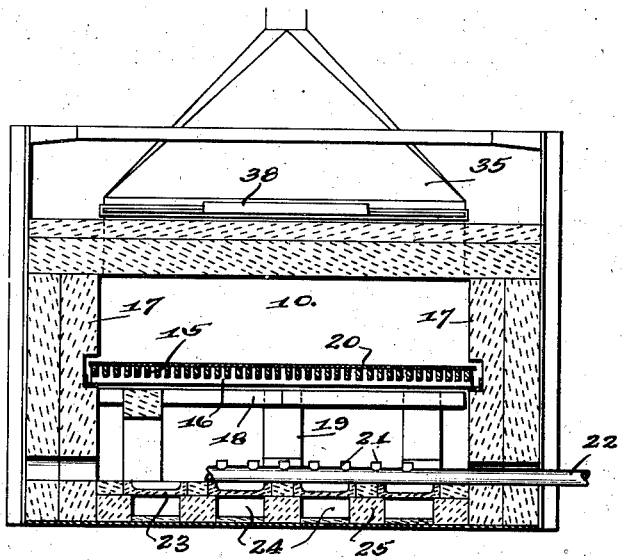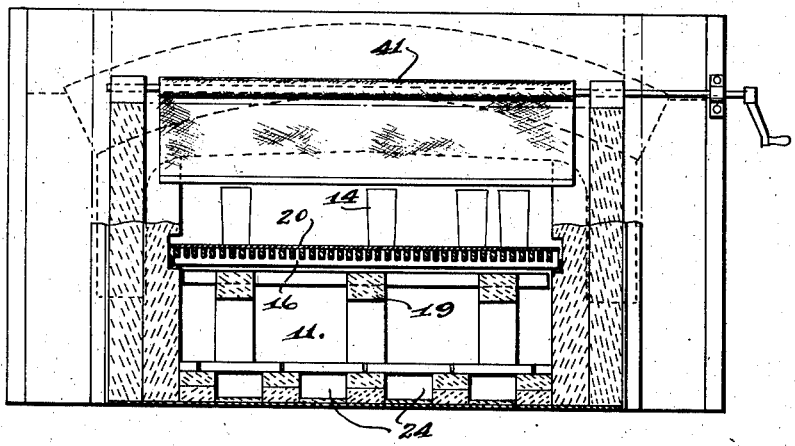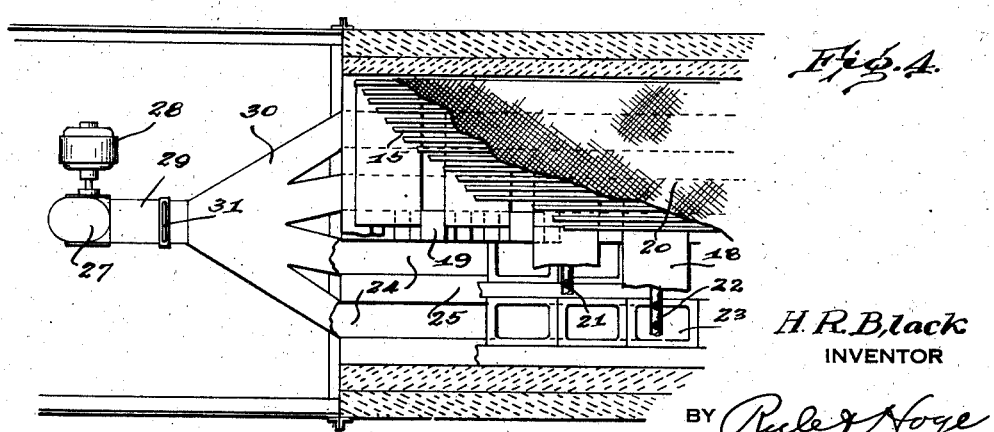

2,280,306

UNITED STATES PATENT OFFICE 2,280,306

PREHEATING CHAMBER FOR DECORATING LEHRS

Harold R. Black, Toledo, Ohio, assignor to Libbey Glass Company, a corporation of Ohio Application May 7, 1940, Serial No. 333,809

7 Claims. (Cl. 49—47)

The present invention relates to heating chambers or lehrs and more particularly to improvements in preheating chambers for use with decorating lehrs. In one process of decorating glassware with metal decorations or enamels, it is customary to preheat the ware after the decorating material has been applied thereto, in a preheating chamber. This serves to volatilize and remove the oils from the decorating material and burn out the resins and/or other combustible constituents before the ware is introduced into the annealing oven.

In this preheating process a difficulty has been encountered owing to the fuming or bloom on the ware which occurs, particularly when a considerable quantity of ware is being treated in the preheating chamber. I have found this bloom or deposit on the ware to be the result of incomplete combustion of the volatile or organic products due to the lack of an adequate supply of fresh air or oxygen within the chamber.

An object of the present invention is to provide a preheating chamber of such design and cooperating means such that a sufficient quantity of fresh air is supplied to the chamber to effect complete combustion of the organic products liberated within said chamber and thereby prevent fuming or objectionable deposits on the ware.

A further object of the invention is to supply fresh preheated air to the preheating chamber in such a manner that it will not interfere with the normal heat treating operations nor with the operations within the lehr or annealing chamber with which the preheating chamber communicates.

A further object of the invention is to supply the fresh preheated air to the preheating chamber in such manner that it will move counter to the direction of movement of the ware through the lehr. In this manner the ware is caused to move continuously into an atmosphere of fresh heated air which provides ideal conditions for burning the organic matter supplied by the decorating material.

A further object of the invention is to provide an apparatus by which the ware is heated at the proper rate and at the required temperature for effecting the volatilization of the oils and burning of the organic matter.

Other objects of the invention will appear hereinafter.

Referring to the accompanying drawings which illustrate a structure embodying the principles of my invention:

Fig. 1 is a longitudinal sectional elevation of such apparatus including a preheating chamber and an adjoining end portion of the communicating lehr or annealing chamber;

Figs. 2 and 3 are cross-sectional elevations, the sections being taken respectively at the lines 2—2 and 3—3 on Fig. 1; and Fig. 4 is a fragmentary sectional plan showing the front end portion of the preheating chamber.

The structure comprises a preheating chamber 10 extending lengthwise thereof and beneath which is a combustion chamber or compartment 11 extending substantially the full length of the chamber 10 and in which the air supplied to said chamber is preheated and mixed. The preheating chamber 10 opens into an annealing chamber 12 of an annealing lehr 13 in which the articles 14 are annealed after passing through the chamber 10.

The floor of the chamber 10 comprises a series of closely spaced bars 15 extending lengthwise of the lehr and attached to transverse supporting bars 16 supported on angle irons seated in recesses in the side walls 17 of the chamber. Transverse slabs or plates 18 of refractory material beneath the bars 16 are spaced apart and mounted on a supporting structure 19 within the combustion chamber 11, such slabs serving as baffles cooperating with burners therebeneath and forming the upper wall of the compartment 11. There is thus provided an openwork structure permitting the passage of the preheated air directly upward into the preheating chamber 10. The ware 14 is carried through the preheating chamber and through the lehr on an endless conveyor 20 which extends lengthwise through the chambers 10 and 12 and is supported during its travel on the bars 15. The conveyor is of conventional construction, being made of wire mesh or other openwork.

The air is heated by means of rows of jet burners 21 on a series of fuel pipes 22 extending transversely through the combustion chamber 11 and spaced at short intervals lengthwise thereof. The pipes 22 are supported on the floor 23 of the chamber 11. Air ducts 24 are arranged directly beneath the floor 23 and extend in parallel the full length of the preheating chamber. In the particular structure herein shown there are four of these air ducts spaced apart by insulating blocks 25 which form the side walls of the air ducts and also provide supports for the thin tile which form the upper walls of the ducts and are comprised in the floor 23 of the heating chamber 11. These tile are sufficiently thin to permit effective radiation of heat therethrough from the combustion chamber 11 for preheating the fresh air as it passes through the ducts 24.

A series of openings 26, extending through the upper walls of the air ducts 24, permit the passage of air from said ducts into the combustion chamber 11. This series of openings does not extend the full length of the ducts 24, the openings being confined to the portion of the ducts nearest the combustion chamber 12, while the walls of the ducts are imperforate from the front end of the ducts rearwardly throughout the greater portion of their length.

A blower 27 (Figs. 1 and 4) at the forward end of the apparatus is driven by an electric motor 28 and draws in fresh air, forcing it through a duct 29 and a manifold 30 which distributes it to the ducts 24. The air is thus forced through the openings 26 into the combustion chamber 11 where it is heated by the burners 22 and mixed with the hot air in said chamber. This heated fresh air passes upwardly directly into the rearward portion of the preheating chamber 10 and thus provides an adequate supply of fresh air or oxygen for completely burning the organic matter released by the decorating material during the preheating operation. The supply of fresh air is also sufficient to carry off the volatile oils. In this manner the usual fuming or bloom on the decorated articles is eliminated. A damper 31 in the flue 29 serves to regulate the fresh air draft. The openings 26 may be graduated, progressively increasing in size toward the rear end of the chamber 11.

The preheated air is for the most part withdrawn from the chamber 10 through an exhaust duct into a stack 33, the draft being regulated by a damper 34 in the stack. An auxiliary exhaust duct 35 which, as shown in Fig. 2, extends across the full width of the preheating chamber, communicates with a suction blower 36 which draws air from the chamber 10 and discharges it through a stack 37. The draft through this duct is regulated by a damper 38.

An exhaust duct 39 is provided at the front end of the lehr and air is drawn upwardly therethrough by a fan 40. This causes an indraft of air through the open end of the preheating chamber, thereby preventing the passage of fumes from said chamber into the surrounding atmosphere or the room in which the apparatus is located. A curtain 41 interposed between the preheating chamber 10 and the annealing chamber 12 prevents the disturbance of conditions within the chamber 12 which might otherwise be caused by the movement of the air from the wind ducts 24 into the preheating chamber and rearwardly toward the exhaust ducts.

I have found that when the decorated ware is fed rapidly or in large quantities from the preheating chamber 10 into the lehr 12, there is sometimes a discoloration of the decorations produced while the ware is in the annealing lehr. In this instance the discoloration or deposit is due directly to incomplete combustion of the fuel gases which supply heat to the lehr. This difficulty is overcome by supplying an adequate amount of fresh, preferably preheated, air into the lehr for effecting a more complete combustion as well as diluting the gases of combustion.

It should be understood that the bloom or deposit on the ware herein referred to in both the preheating chamber 10 and the lehr 12 is a discoloration of the decorating material mainly rather than the uncoated surfaces of the ware.

Modifications may be resorted to within the spirit and scope of my invention.

I claim:

1. Apparatus for decorating articles comprising a horizontally disposed heating chamber, a conveyor extending lengthwise therethrough for conveying articles through said chamber, a combustion chamber beneath said heating chamber and extending lengthwise therealong, burners within the combustion chamber and distributed at intervals therealong, means for supplying fuel to the burners, the floor of said heating chamber being of openwork construction providing communication between said chambers and permitting the hot gases to pass upwardly directly into the heating chamber, and means for supplying air under pressure to a restricted zone of the combustion chamber remote from the front end and in which zone some of said burners are located and causing said air to be preheated by the burners within said restricted zone, a portion of said openwork floor extending over said zone and positioned to permit the heated air to pass from said zone directly upward into the said heating chamber.

2. Apparatus for decorating articles comprising a horizontally disposed heating chamber, a conveyor extending lengthwise therethrough for conveying articles through said chamber, a combustion chamber beneath said heating chamber and extending lengthwise therealong, burners within the combustion chamber and distributed at intervals therealong, means for supplying fuel to the burners, the floor of said heating chamber being of openwork construction providing communication between said chambers and permitting the hot gases to pass upwardly directly into the heating chamber, and means for supplying air under pressure to a restricted zone of the combustion chamber remote from the front end and in which zone some of said burners are located and causing said air to be preheated by the burners within said restricted zone, a portion of said openwork floor extending over said zone and positioned to permit the heated air to pass from said zone directly upward into the said heating chamber, said means for supplying air including a conduit extending in proximity to the burners for preheating said fresh air by heat supplied from said burners prior to the introduction of the air into the combustion chamber.

3. Apparatus for decorating articles comprising a horizontally disposed heating chamber, a conveyor extending lengthwise therethrough for conveying articles through said chamber, a combustion chamber beneath said heating chamber and extending lengthwise therealong, burners within the combustion chamber and distributed at intervals therealong, means for supplying fuel to the burners, the floor of said heating chamber being of openwork construction providing communication between said chambers and permitting the hot gases to pass upwardly into the heating chamber, and means for supplying air under pressure to a restricted zone of the combustion chamber remote from the front end and causing said air to be preheated within said combustion chamber and pass therefrom upwardly into the said heating chamber, said means for supplying fresh air comprising ducts beneath the combustion chamber and extending lengthwise thereof, the walls of said ducts having perforations along said restricted zone providing communication between the said ducts and the combustion chamber.

4. Apparatus for decorating articles comprising a horizontally disposed heating chamber, a conveyor extending lengthwise therethrough for conveying articles through said chamber, a combustion chamber beneath said heating chamber and extending lengthwise therealong, burners within the combustion chamber and distributed at intervals therealong, means for supplying fuel to the burners, the floor of said heating chamber being of openwork construction providing communication between said chambers and permitting the hot gases to pass upwardly into the heating chamber, and means for supplying air under presure to a restricted zone of the combustion chamber remote from the front end and causing said air to be preheated within said combustion chamber and pass therefrom upwardly into the said heating chamber, said means for supplying fresh air comprising ducts beneath the combustion chamber and extending lengthwise thereof, the walls of said ducts having perforations along said restricted zone providing communication between the said ducts and the combustion chamber, the floor of said combustion chamber comprising upper wall portions of the fresh air ducts and being sufficiently thin to permit effective transmission of heat from the combustion chamber therethrough for heating the fresh air during its passage through said ducts.

5. Decorating apparatus comprising a horizontally disposed heating chamber, a conveyor extending lengthwise therethrough for conveying ware through said chamber, a combustion chamber beneath the heating chamber and extending lengthwise thereof, the floor of said heating chamber being of openwork construction providing communication between said chambers, an exhaust duct opening directly into the heating chamber adjacent the front end thereof through which hot gases are drawn from the chamber, an auxiliary exhaust duct opening directly into the heating chamber at the front end thereof, and means to create a draft through said auxiliary duct and thereby prevent the passage of fumes or gases from the heating chamber to the outside air.

6. The method of decorating glassware which comprises applying to the ware a decorating material which, when subjected to heat, liberates volatile or combustible gases, passing the ware through a heating chamber, introducing into said chamber gases of combustion produced by burning fuel and thereby supplying heat to said chamber, concomitantly introducing into said chamber fresh air in sufficient quantity to burn the gaseous products liberated from the decorating material and thereby preventing discoloration of the decorating material by a deposit thereon from said liberated gases, preheating said fresh air by heat supplied by said burning fuel, and causing a graduated distribution lengthwise of the heating chamber of the air entering said chamber.

7. The method of decorating glassware which comprises applying to the ware a decorating material which, when subjected to heat, liberates volatile or combustible gases, passing the ware through a heating chamber, introducing into said chamber gases of combustion produced by burning fuel and thereby supplying heat to said chamber, concomitantly introducing into said chamber fresh air in sufficient quantity to burn the gaseous products liberated from the decorating material and thereby preventing discoloration of the decorating material by a deposit thereon from said liberated gases, passing the ware from said heating chamber into and through an annealing chmber, introducing gases of combustion into the annealing chamber and maintaining a high temperature therein by which the ware is annealed during its passage therethrough, and supplying fresh preheated air within the annealing chamber in sufficient amounts to effect substantially complete combustion of the fuel gases, thereby preventing deposits of discoloring material on the decorated ware.

HAROLD R. BLACK.